Figure 1:
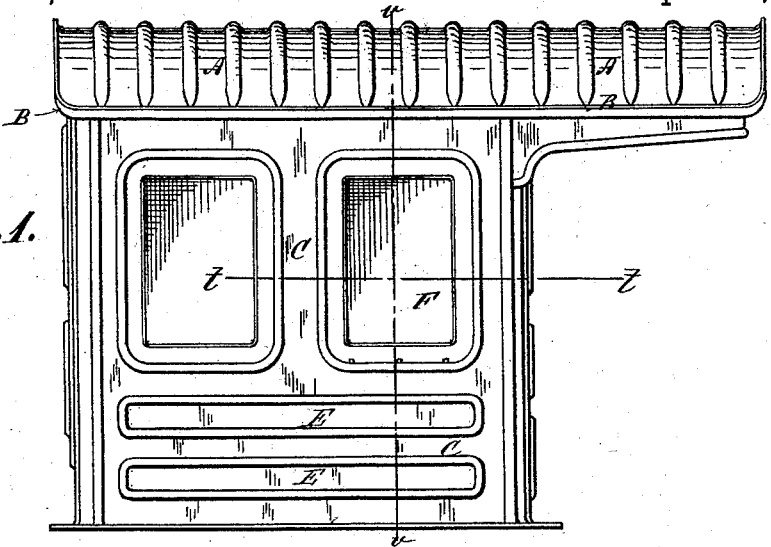

(No Model.) 2 Sheets—Sheet 1.

E. W. M. HUGHES.
CAB FOR LOCOMOTIVES.

No. 505,163. Patented Sept. 19, 1893.

Witnesses:
Wm Voss
N. S. Hartwell

Inventor:
E. W. M. Hughes.

(No Model.) 2 Sheets—Sheet 2.

E. W. M. HUGHES.
CAB FOR LOCOMOTIVES.

No. 505,163. Patented Sept. 19, 1893.

Witnesses.
Inventor:

UNITED STATES PATENT OFFICE.

EDWARD WILLIAM MACKENZIE-HUGHES, OF CHICAGO, ILLINOIS, ASSIGNOR TO THE FOX SOLID PRESSED STEEL COMPANY, OF SAME PLACE.

CAB FOR LOCOMOTIVES.

SPECIFICATION forming part of Letters Patent No. 505,163, dated September 19, 1893.

Application filed June 21, 1889. Serial No. 315,134. (No model.)

*To all whom it may concern:*

Be it known that I, EDWARD WILLIAM MACKENZIE-HUGHES, of the city of Chicago, county of Cook, and State of Illinois, have invented a new and useful Improvement in Cabs for Locomotive-Engines, of which the following is a full, true, and exact description, reference being had to the accompanying drawings.

My invention relates to an improved cab for locomotive engines in which the body of the cab is made of metal, and the roof is made of corrugated metal. By preference I use pressed steel for forming these parts. The cab itself is of the ordinary shape,—the sides and roof being formed of metal joined together as indicated in the drawings.

My invention will be readily understood from the accompanying drawings, in which—

Figure 2:
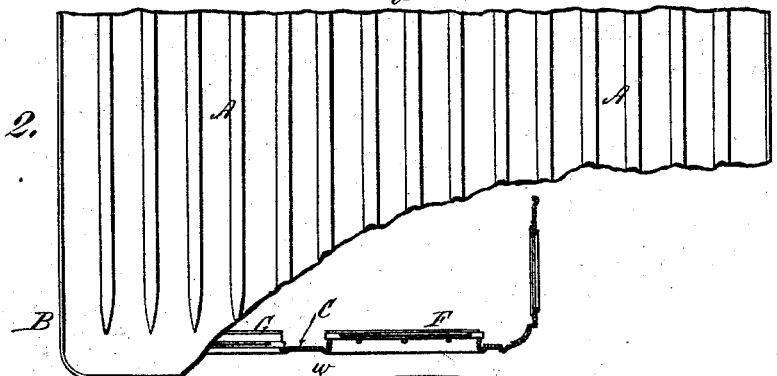
Figure 3:
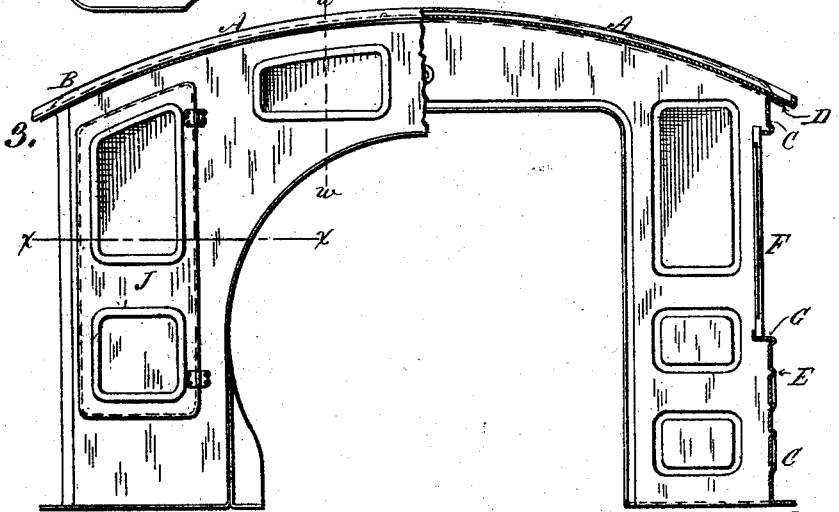
Figure 4:
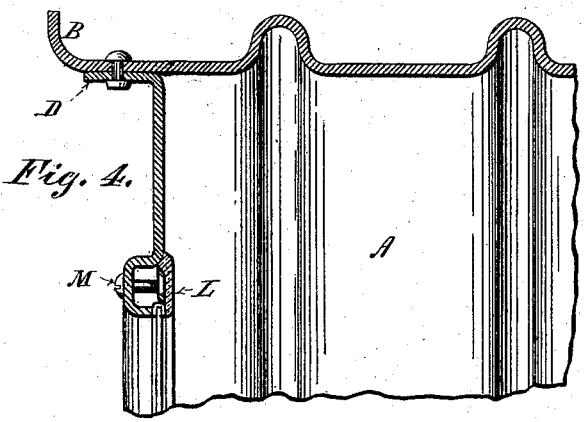
Figure 5:
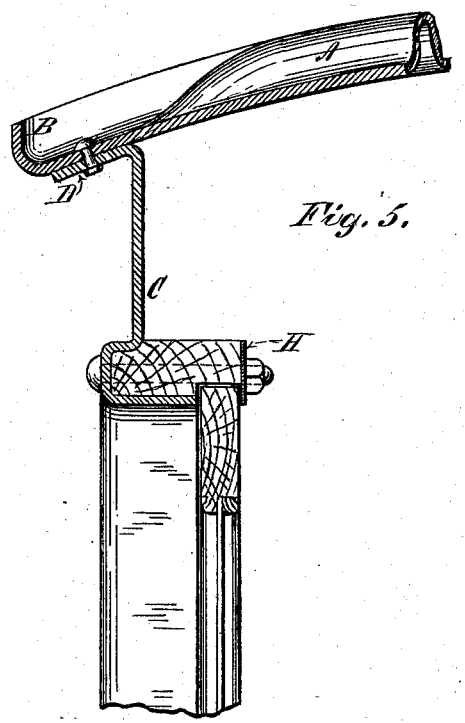

Figure 1, represents a vertical elevation of the side of the cab; Fig. 2, a view of the roof of the cab partly broken away, showing a section through Fig. 1 on the line $t\ t$; Fig. 3, a view of the front of the cab, the right side being partly broken away to show a section through Fig. 1, on the line $v\ v$; Fig. 4, a view of the inside of the roof of the car partly in section on the line $w\ w$, Fig. 3; Fig. 5, a vertical section through the rear window on the opposite side of the cab from that shown in Fig. 1; and Fig. 6, a section through Fig. 3 on the line $x\ x$.

The roof A of the cab is made of corrugated metal, the corrugations tapering off toward the ends, as shown, where the roof forms a water shed over the sides of the cab. This roof is by preference flanged at the edges, as shown at B, forming a water gutter there from which the water is led off by suitable means. The sides of the cab are formed of one piece of metal C flanged at the upper end at D to fit the roof, to which it is by preference riveted. Within the sides are openings for windows, as shown, and the lower parts of these sides are preferably corrugated, as at E. As shown, the front windows of the cab are stationary, while the rear window slides forward so as to overlap the front window. The rear window F is held at the bottom in a flange of the cab side proper, as shown at G, while the upper part slides within a plate H suitably bolted through a block of wood to the sides of the cab, as shown in Fig. 5. The side of the cab is joined to the front in the manner shown in Fig. 6, in which the part C overlaps the part H', which forms the front of the cab, to which it is suitably riveted or otherwise attached. The front of the cab is provided with running board doors J formed of flanged metal the flanges overlapping the flanges of the front plate of the cab, as shown at K, Fig. 6. These doors are preferably hinged, as shown in Fig. 3, and the flanging of the front plate adds to the strength and makes a tight door at that point.

Figure 6:
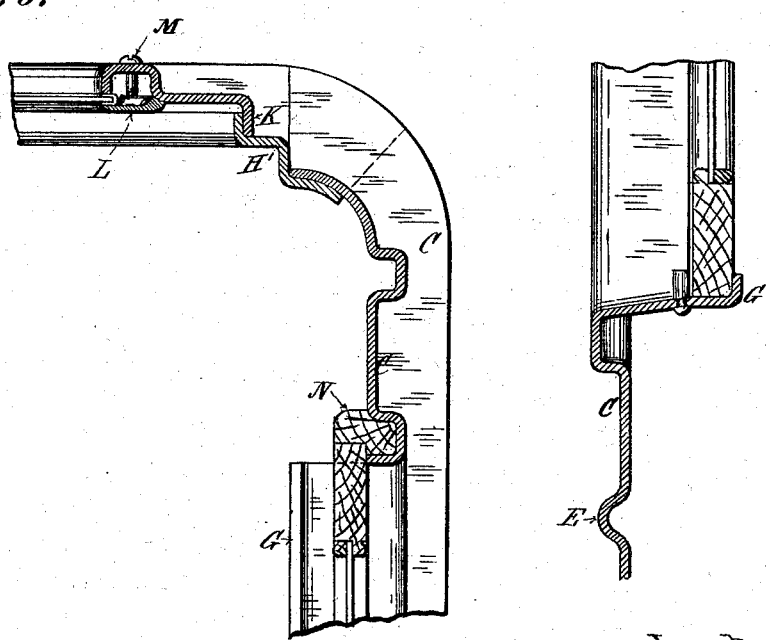

The method of fitting the glass in the iron frames is shown in Figs. 4 and 6. The glass itself, by preference provided with a light frame, which may be metallic, around its edge, is clamped against the metal part of the cab by an interior clamp L drawn up by bolt M,— the glass itself being held between the edge of the corrugation surrounding it and the internal clamp. In some cases the glass may be fixed in a wooden frame shaped to the corrugation, as shown at N in the side glass in Fig. 6. The metal portions, excepting in the respects indicated, are fitted together in the usual way. This cab possesses extreme lightness, which is gained by the method of corrugating the metal and flanging the same at the joints to take the place of corner pillars and angle irons. It has likewise fewer pieces than the ordinary cab now in use. It is solid, and consequently noiseless, and the window frames, roof and side walls are strengthened by corrugating the metal in suitable forms, as shown.

What I claim as my invention, and desire to secure by Letters Patent, is—

1. The combination with the side walls of an engine cab of the herein described continuous piece of metal constituting the roof of the cab and formed with the transverse corrugations, and with its edges flanged to form a water gutter, substantially as described.

2. An engine cab composed of the roof formed of a single piece of corrugated pressed steel, the sides each formed of a single piece of corrugated pressed steel flanged at its edges and the front formed of a single piece of corrugated pressed steel flanged at its edges, these parts being united together by their flanged edges to form a pressed steel cab, substantially as and for the purpose set forth.

3. The front plate for engine cabs consisting of a plate of pressed steel having openings therein for windows and doors, the opening of the running board door being flanged and the running board door fitting around said flange, substantially as described.

4. The combination with the flanged side of an engine cab of a corrugation presenting an inwardly projecting edge around the window frame, an internal plate or clip for holding the glass in position, and a bolt passing through the corrugation for drawing the clip against the glass, substantially as described.

5. In an engine cab the combination of a pressed steel side formed with a flanged edge and a pressed steel front also formed with a flanged edge, the said flanged edges being united together to form a corner of the cab without carrying a corner post, substantially as described.

In testimony whereof I have signed my name to this specification in the presence of two subscribing witnesses.

EDWARD WILLIAM MACKENZIE-HUGHES.

Witnesses:
W. J. HARTWELL,
WM. VOSS.